United States Patent

[11] 3,584,302

[72] Inventor Kenneth P. Lundgren
Arlington Heights, Ill.

[21] Appl. No. 790,262
[22] Filed Jan. 10, 1969
[45] Patented June 8, 1971
[73] Assignee Motorola, Inc.
Franklin Park, Ill.

[54] ENCODER-DECODER CIRCUIT INCLUDING A CONTINUOUSLY OPERABLE OSCILLATOR CIRCUIT
10 Claims, 1 Drawing Fig.

[52] U.S. Cl. .......... 325/22, 325/18
[51] Int. Cl. .......... H04b 1/54
[50] Field of Search .......... 325/15, 18, 19, 21, 22; 331/59; 179/1; 340/156

[56] References Cited
UNITED STATES PATENTS
3,250,997 5/1966 Cole et al. .......... 325/18
3,332,034 7/1967 Sanger et al. .......... 325/18

*Primary Examiner*—Robert L. Richardson
*Assistant Examiner*—Albert J. Mayer
*Attorney*—Mueller, Aichele and Rauner

ABSTRACT: A tone signal encoder-decoder for a transmitter-receiver including a portion thereof acting as an oscillator circuit which produces continuous oscillations of a selected frequency which are applied to the transmitter. The received tone signal which are applied to the oscillator and a detector is connected to the output thereof. An amplitude limiting circuit of the oscillator limits the oscillations to a predetermined value so as not to operate the detector, yet of sufficient amplitude to modulate the transmitter for encoder operation. In decoder operation the received tone signal applied to the oscillator is of sufficiently greater amplitude than that produced by the oscillator to activate the detector, which operates a DC switch activating the receiver audio amplifier. The encoder-decoder requires no electrical or mechanical switching to provide either the encode or decode function.

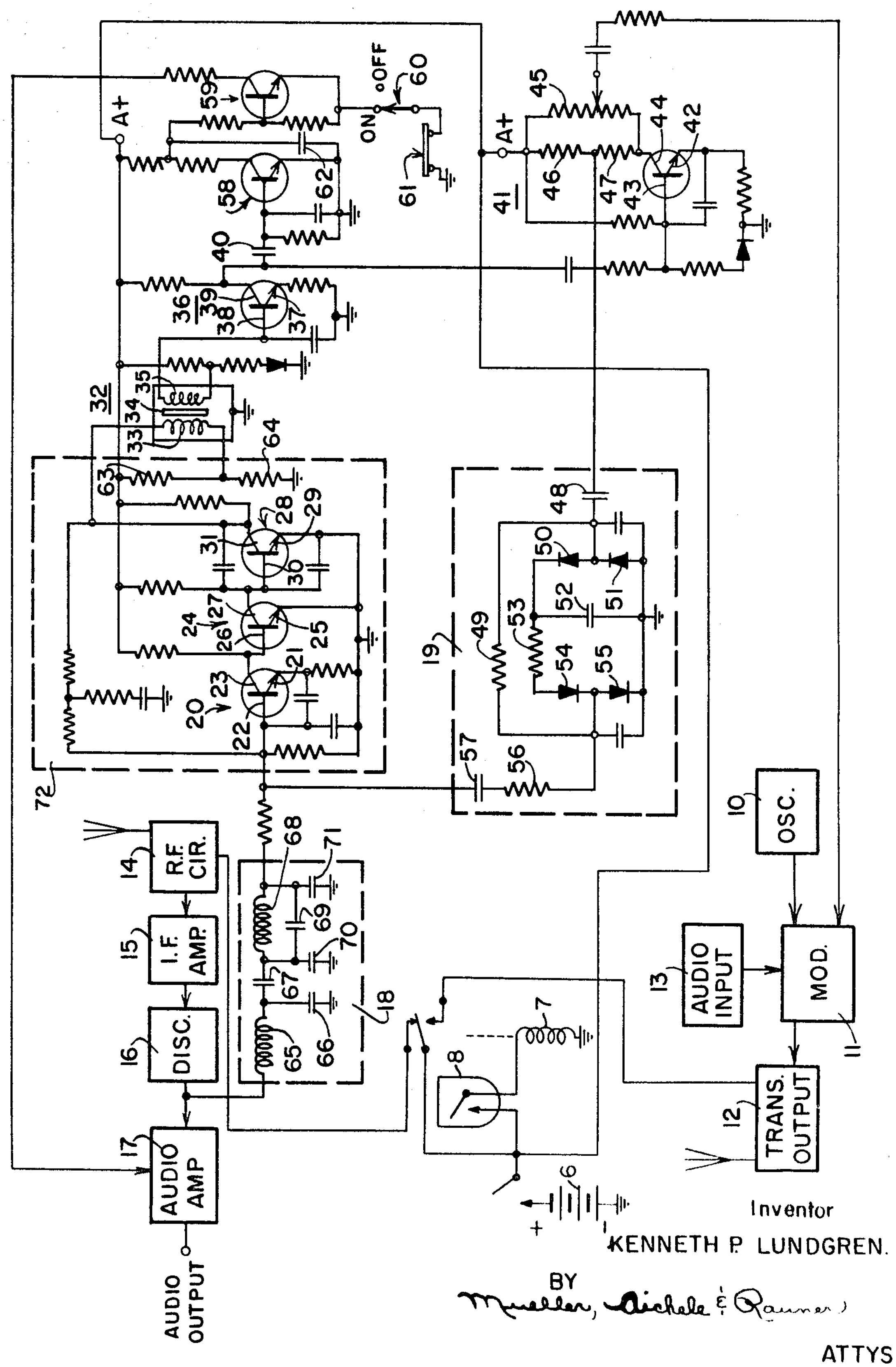
Inventor
KENNETH P. LUNDGREN
BY
Mueller, Aichele & Rauner
ATTYS

ENCODER-DECODER CIRCUIT INCLUDING A CONTINUOUSLY OPERABLE OSCILLATOR CIRCUIT

BACKGROUND OF THE INVENTION

Two way radio equipment providing both transmitting and receiving functions in a single unit require simple, dependable and inexpensive circuitry in the form of a compact and rugged unit. Achieving these optimum conditions necessitates that the equipment contain the smallest number of electrical and mechanical parts. The difficulties in achieving these optimum conditions are increased when additional facilities are required, as in tone coded systems in which the receivers are responsive only to messages transmitted in connection with a coded tone of a given frequency. Coded tone operation requires a tone source such as an oscillator for the transmitting or encoder function, to provide the tone of given frequency which is transmitted to the receivers, and further requires a frequency responsive device in each receiver that will cause the receiver in which it is incorporated to operate upon receipt of the coded tone signal. A tone operated squelch system has been incorporated in prior art transmitter-receivers by the use of a single circuit as both the encoder and decoder circuit. When operating as a decoder circuit, the detected tone signal is coupled to a frequency selective circuit which produces an output only if the tone signal is of the predetermined frequency. The output signal from the frequency selective circuit is coupled to the audio portion of the receiver to energize the audio portion. When operating as an encoder, the output circuit from the frequency selective circuit is coupled back to the input of the frequency of the selective circuit to form a feedback oscillator. Thus, it is necessary to switch the signal paths in the encoder-decoder portion depending upon the circuit operation desired.

Circuits such as described above have been used to advantage for many years. However, they have certain disadvantages. Mechanical or electrical switching of the signal path in the encoder-decoder is necessary depending upon the circuit operation desired. Loss of time and transmitted message results when encoder oscillations must be started and built up to a level sufficient to modulate the transmitter. Means have been employed which increase the starting time of these oscillations. However, these increased speeds of oscillator startup result in high amplitude initial oscillations causing an over modulation of the transmitter.

SUMMARY OF THE INVENTION

It is, therefore, an object of this invention to provide an improved combined tone signal encoder-decoder wherein the startup time in encoder operation is eliminated.

Another object of this invention is to provide an improved combined tone signal encoder-decoder wherein no electrical or mechanical switching is necessary to provide encoder or decoder operation.

Yet another object of this invention is to provide a combined tone signal encoder-decoder wherein the initial high amplitude oscillation in encoder operation is eliminated.

A feature of this invention is the provision of the tone signal encoder-decoder wherein continuous operation of a portion of the encoder as an oscillator takes place.

Another feature of this invention is the provision of the tone signal encoder-decoder for an amplitude limiting circuit to limit the oscillations produced by the encoder to a predetermined level.

Yet another feature of this invention is the provision of the tone signal encoder-decoder for disabling the decoder when the microphone is removed from its mounting bracket or the switch is moved to its off position.

In practicing this invention a transmitter-receiver is provided which includes a power supply and switching means for alternately coupling the power supply to the transmitter or the receiver for the desired operation of the transmitter-receiver. The transmitter includes a modulator circuit, and the receiver includes a modulator circuit, and the receiver includes an audio amplifier circuit which is normally biased to be inoperative and a discriminator circuit coupled to the audio amplifier circuit. The discriminator circuit is designed to develop tone signals in response to input signals applied thereto.

In the encoder-decoder circuit a tone frequency selective device is provided having an input tone amplifier and output tone amplifier. A feedback amplifier having its output coupled to the modulator and an amplitude limiting circuit is coupled to the output of the output tone amplifier. The output of the amplitude limiting circuit is coupled to the input of the input tone amplifier. The above described circuits act to form an oscillator circuit which develops an output tone signal having the frequency to which the tone frequency selective device is tuned. Tone signals thus developed are continuously present and applied to the modulator. The tone signals are limited in amplitude to a predetermined level by the amplitude limiting circuit. When the power supply is coupled to the transmitter, the carrier frequency signal of the transmitter is immediately modulated by the tone frequency signal. This eliminates the undesirable affects of delays in transmitted messages and loss of portions of transmitted messages resulting from delays in tone oscillation startup inherent in encoder-decoders with switched encode-decode functions. Modulation of the carrier frequency signal of the transmitter with a constant amplitude tone signal eliminates undesirable overmodulation of the carrier frequency signal resulting from attempts in prior art encoder-decoders to decrease the tone oscillation startup time of encoder-decoders with switched encode-decode functions.

Coupled to the receiver discriminator is a filter having its output coupled to the input of the input tone amplifier. A detector which is not responsive to the low level, limited amplitude oscillations produced by the oscillator circuit is coupled to the output of the output tone amplifier. A D.C. switch having its input coupled to the detector and its output coupled to the audio amplifier biases the audio amplifier to be operative. When the power supply is coupled to the receiver, tone signals are coupled from the discriminator to the input of the input tone amplifier and are much greater in amplitude than tone signals coupled from the output of the amplitude limiting circuit to the input of the tone amplifier. The greater amplitude signals are amplified by the input tone amplifier and coupled through the tone frequency selective device to an output amplifier and there further amplified to a level necessary to activate the detector and DC switch thereby biasing the audio amplifier to be operative and allowing audio signals from the discriminator to be coupled to the audio output circuits of the receiver. A monitor switch and hang-up box are alternate means provided to bias the audio amplifier to be operative and allow audio signals from the discriminator to be coupled to the audio output circuits of the receiver.

When the desired tone frequency ceases to be present at the discriminator, output signals from the tone frequency selective device will quickly decay in amplitude until they reach a level which is sustained by the oscillator circuit.

BRIEF DESCRIPTION OF THE DRAWING

The single FIGURE of the drawing is a partial black diagram and partial schematic diagram of a transmitter, a receiver and the selective tone coded squelch system.

DESCRIPTION OF THE PREFERRED EMBODIMENT

Referring now to the drawing, the radio transmitter is formed by oscillator 10 which generates a radio frequency signal and modulator 11 which is coupled to the oscillator. An audio input signal from audio input circuit 13 is also coupled to modulator 11 to modulate the radio frequency signal. The output of modulator 11 is coupled to a transmitter output portion 12 where it may be further amplified and increased in frequency in a manner well known in the art.

The radio receiver includes a radio frequency portion 14 which selects and converts the received wave to an intermediate frequency. The intermediate frequency wave is amplified in amplifier 15 and applied to discriminator 16. The discriminator derives the audio modulating signals, which may include tone and voice signals, from the received wave. The voice signals are amplified by audio amplifier 17.

A battery 6, or other electrical supply, supplies power to the transmitter and receiver through the contacts of relay 7. Push-to-talk switch 8 energizes relay 7 to switch the supply voltage from the receiver to the transmitter.

The combined encoder-decoder circuit includes input filter 18 coupled to discriminator 16 to select the tone signals from the audio output. The tone signals are applied to frequency selective means for distinguishing between tone signals of different frequencies and which includes input tone amplifier 72, reed filter 32, and output tone amplifier 36. Output amplifier 36 is coupled to detector 58 and feedback amplifier 41. Feedback amplifier 41 is coupled to the transmitter modulator 11, and to amplitude limiting circuit 19, which is coupled back to the input of tone amplifier 72.

When operating voltage is initially applied to the encoder-decoder circuit, current from the power supply, flowing through input coil 33 of reed filter 32 causes the mechanical reed 34 to vibrate at its resonant frequency. This vibrational energy is coupled to output coil 35 of reed filter 32. The output of reed filter 32 is coupled to output amplifier 36 for amplification, and the output of output amplifier 36 is coupled to feedback amplifier 41 for further amplification. Output signals from feedback amplifier 41 are coupled through amplitude limiting circuit 19, which limits the amplitude of the signals to a predetermined level, to the input of input tone amplifier 72. This amplifier including transistors 20, 24, and 28, amplifies the signal and couples it to input coil 33 of reed filter 32. Thus, input tone amplifier 72, reed filter 32, output amplifier 36, feedback amplifier 41, and amplitude limiting circuit 19, form an oscillator circuit which develops an output tone signal having the frequency to which reed filter 32 is tuned. The output signal thus developed is continuously present and is coupled from collector 44 of transistor 41 through potentiometer 45, which allows the modulation level of the transmitter to be adjusted, to the modulator 11 to modulate the carrier frequency signal of the transmitter when the power supply is coupled to the transmitter.

In order to maintain the tone signal modulation of the transmitter at a constant amplitude when operation is switched from the receiver to the transmitter and under varying voltage and temperature conditions, an amplitude limiting circuit 19 is included in the oscillator circuit. Signals at the output of feedback amplifier 41 are coupled through capacitor 48 to the junction of diodes 50 and 51 where the signal is rectified to produce a voltage across capacitor 52. When the developed voltage is below a predetermined value, no current will flow through resistor 53 and diodes 54 and 55. The signal fed back from amplifier 41 will then be coupled through resistor 49 and output resistor 56 and capacitor 57 to the input of input tone amplifier 72. When the voltage developed across capacitor 52 exceeds a predetermined value, current will flow through diodes 54 and 55 lowering their resistance. The resistance values of diodes 54 and 55 will continue to decrease towards (but never reach) a fixed minimum value as the voltage developed across capacitor 52 and the current flowing through diodes 54 and 55 increases. The combination of resistor 49 and diodes 54 and 55 will therefore act together to form a variable resistive voltage divider which will attenuate the amplitude of the signals fed back from output amplifier 41 to the input of input tone amplifier 72, thereby maintaining the amplitude of oscillations at a constant level.

When the power supply is coupled to the receiver, carrier frequency signals are received and converted by means well known in the art to intermediate frequency signals which are amplified in intermediate frequency amplifier 15. Intermediate frequency signals from intermediate frequency amplifier 15 are coupled to discriminator 16 where audio signals, including tone signals, are detected. Output signals from discriminator 16 are coupled to audio amplifier 17 and then to the audio output of the receiver. Audio amplifier 17 is normally biased to be inoperative except during the receipt of a particular tone signal which acts to bias audio amplifier 17 to be operative.

In operation as a receiver, tone signals detected by discriminator 16 are coupled to filter 18 of the encoder-decoder. Coil 65 and capacitor 66 of filter 18 comprise a low frequency roll-off filter used to minimize the response of audio amplifier 17 to the tone signals. Capacitors 67, 69, 70, and 71 and inductor 68 comprise a low-pass filter which serves to couple tone signals in the proper frequency range from the output of the low frequency roll-off filter to the input of input tone amplifier 72 where the tone signals are amplified, and coupled to the input of reed filter 32. Tone signals of the desired frequency coupled to coil 33 of reed filter 32 act to cause mechanical vibrations of reed 32, thus, coupling energy to the output coil 35. Tone signals which are not of the desired frequency are highly attenuated by reed filter 32 and are not coupled to the output coil 35. Tone signals coupled from the discriminator 16 to the input of input tone amplifier 72 are much greater in amplitude than signals coupled from the amplitude limiting circuit 19 to the input of tone amplifier 72. The greater amplitude signals when amplified by input tone amplifier 72 and coupled to input coil 33 of reed filter 32 will cause very hard mechanical vibration of reed member 33. Tone signals produced at the output of reed filter 32 as a result of the hard mechanical vibration of member 33 are coupled to output amplifier 36 for further amplification and the output of output amplifier 36 is coupled to detector 58. The amplitude of the signals thus produced at the output of amplifier 36 is above the threshold of operation of detector 58, and, when coupled to detector 58, will cause it to conduct discharging capacitor 62 and causing transistor switch 59 to cut off. When transistor switch 59 is cut off the direct current bias signals applied to audio amplifier 17 are removed and audio signals from discriminator 16 are coupled to the audio output circuits of the receiver. Switch 60 and hang-up box 61 are alternate means which have been provided to remove the direct current bias signals applied to audio amplifier 17. By removing the microphone from the hang-up box or by moving switch 60 to the off position, the audio amplifier is rendered operative and the receiver channel may be monitored by the operator.

When tone signals of the desired frequency cease to be present at the discriminator 16 mechanical vibrations of member 34 reed filter 32 will quickly decay in amplitude until they reach a level which is sustained by the oscillator circuit comprised of reed filter 32, output amplifier 36, input tone amplifier 72, feedback amplifier 41 and the amplitude limiting circuit 19 thereby allowing the use of the circuit as an encoder.

Thus, an encoder-decoder circuit for use in a transmitter receiver has been described wherein no electrical or mechanical switching is necessary to operate in either the encoder or decoder mode. In addition, no loss in transmission or delay is incurred as a result of startup time in the decoder because the encoder circuit is oscillating at all times. As a result of the continuous oscillation of the encoder circuit combined with the use of an amplitude limiting circuit, the initial high amplitude oscillation and resulting transmitter over modulation, resulting from efforts to quickly start the encoder oscillations, are now eliminated.

I claim:

1. A tone signal encoder-decoder circuit for a transmitter-receiver having a power supply and switching means for alternately coupling the power supply to the transmitter and receiver, and wherein the transmitter includes a modulator circuit and the receiver includes an audio amplifier circuit which is normally biased to be inoperative, and a discriminator circuit coupled to the audio amplifier circuit and adapted to develop tone signals in response to input signals applied thereto, said tone signal encoder-decoder including in combination, oscillator means operating continuously to develop a tone signal of a particular frequency, said oscillator means including feedback circuit means having means to limit the amplitude of feedback signals to hold said developed tone signal to a predetermined level, means for coupling said oscillator means to the modulator for applying the developed tone signal thereto whereby the transmitter provides a wave modulated by the particular developed tone signal when the power supply is coupled thereto, input coupling means for coupling the receiver discriminator to said oscillator means for applying thereto tone signals received when the power supply is coupled to the receiver, said oscillator means being operative to amplify tone signals of the particular frequency coupled thereto from the discriminator to a level greater than said predetermined level, and detector means coupled to said oscillator means and responsive to said amplified tone signal having an amplitude in excess of said predetermined level to develop a bias voltage to render the receiver audio amplifier circuit operative.

2. The tone signal encoder-decoder circuit of claim 1 wherein said input coupling means includes filter means coupled to said discriminator, and wherein said oscillator means includes tone frequency selective and amplifying means having an input coupled to said filter means and an output, said tone frequency selective and amplifying means being responsive to said particular tone signal to select and amplify the same, and wherein said feedback circuit means includes amplifier means having an input coupled to said output of said tone frequency selective and amplifying means and an output coupled to the modulator.

3. The tone signal encoder-decoder circuit of claim 2 wherein said tone frequency selective and amplifying means includes an amplifier having a plurality of transistor stages and a tone frequency selective device.

4. The tone signal encoder-decoder circuit of claim 2 wherein said tone frequency selective and amplifying means includes an amplifier having a plurality of transistor stages and a contactless, resonant reed filter unit.

5. The tone signal encoder-decoder circuit of claim 2 wherein said amplitude limiting means of said feedback circuit means includes, input circuit means coupled to said output of said feedback amplifier means and output circuit means coupled to said input of said frequency selective and amplifying means, first and second circuit portions coupled in parallel between said input and output circuit means, said first circuit portion providing a fixed attenuation path for said feedback signal when said developed tone signal is below a predetermined value, said second circuit portion acting together with said first circuit portion when said developed tone signal exceeds a predetermined level to form a voltage divider for attenuating said feedback signal to thereby maintain said developed tone signal amplitude at a predetermined level.

6. A tone signal encoder-decoder circuit for a transmitter-receiver having a power supply and switching means for alternately coupling the power supply to the transmitter and the receiver, and wherein the transmitter includes a modulator circuit and the receiver includes an audio amplifier circuit which is normally biased to be inoperative, and a discriminator circuit coupled to the audio amplifier circuit and adapted to develop tone signals in response to input signals applied thereto, said tone signal encoder-decoder including in combination, means coupling said power supply to said encoder-decoder, input filter means coupled to the discriminator for receiving the tone signal therefrom, tone frequency selective and amplifying means having an input circuit coupled to said filter means and an output circuit, said tone frequency selective and amplifying means being responsive to a particular tone signal coupled thereto from said discriminator to select and amplify the same to a level greater than a first predetermined level, feedback amplifier means having an input coupled to said tone frequency selective and amplifying means and an output coupled to the modulator, amplitude limiting means coupled between said feedback amplifier output and said tone frequency selective and amplifying means input circuit, said feedback amplifier means, said amplitude limiting means, and said tone frequency selective and amplifying means forming an oscillator circuit which operates continuously to develop said particular tone frequency, said amplitude limiting means acting to attenuate the signal applied to said tone frequency selective and amplifying means from said feedback amplifier means so that said developed particular tone signal has an amplitude less than said first predetermined level, means coupling said developed particular tone signal from said oscillator to said transmitter whereby the transmitter provides a wave modulated by the particular tone signal when said power supply is coupled to said transmitter, detector means coupled to said output circuit of said tone frequency selective and amplifying means and responsive to said particular tone frequency signal having an amplitude greater than said predetermined level to develop a bias voltage, and switch means coupled to said detector means and to the audio amplifier circuit and responsive to said bias voltage to render said audio amplifier circuit operative.

7. The tone signal encoder-decoder circuit of claim 6 wherein said tone frequency selective and amplifying means includes an amplifier having a plurality of transistor stages and a tone frequency selective means.

8. The tone signal encoder-decoder circuit of claim 6 wherein said tone frequency selective and amplifying means includes an amplifier having a plurality of transistor stages and a contactless resonant reed filter unit.

9. The tone signal encoder-decoder circuit of claim 6 wherein said amplitude limiting means includes, input circuit means coupled to said feedback amplifier means and output circuit means coupled to said frequency selective and amplifying means, first and second circuit portions coupled in parallel between said input and said output circuit means, said first circuit portion providing a fixed attenuation path for said particular tone frequency signal when said signal is below a predetermined value, said second circuit portion acting together with said first circuit portion when said particular tone frequency signal exceeds a predetermined level to form a voltage divider for further attenuating said particular tone frequency signal in relation to the amplitude thereof to thereby maintain said amplitude at a predetermined level.

10. The tone signal encoder-decoder circuit of claim 9 wherein said said output circuit means being coupled to said second junction, said limiting means includes, a second circuit portion having first diode means and second diode means series connected at a first junction, said input circuit means being coupled to said first junction, reactance means coupled in parallel with said series connected first and second diode means, said diode means and reactance means rectifying said particular tone frequency signal to develop a bias voltage, first resistance means and third and fourth diode means serially coupled to one another said serial combination being coupled in parallel with said reactance means, said series connection of third and fourth diodes forming a second junction, said first circuit portion including second resistance means coupled from said input circuit means to said output circuit means, said second resistance means providing a fixed attenuation path for said particular tone frequency signal when said signal is below a predetermined level, said third and fourth diode means conducting when said developed bias voltage exceeds a predetermined value, in response to said particular tone frequency signal exceeding said predetermined level, thereby lowering the resistance of said third and fourth diode means, said first resistance means acting together with said third and fourth diode means to form a voltage divider for further attenuating said particular tone frequency signal in relation to the amplitude thereof to thereby maintain said amplitude at a predetermined level.